United States Patent Office 3,103,490
Patented Sept. 10, 1963

3,103,490
WAX-LIKE FLUOROCARBON TELOMER COMPOSITIONS
Larry Quentin Green, Wilmington, Del., assignor to E. I. du Pont de Nemours and Company, Wilmington, Del., a corporation of Delaware
No Drawing. Filed June 8, 1960, Ser. No. 34,606
4 Claims. (Cl. 252—15)

This invention is directed to a novel composition comprising a fluorocarbon telomer and a titanium compound, and more particularly, with a composition comprising a fluorocarbon telomer having wax-like characteristics and a selected ester of orthotitanic acid ($H_4TiO_4$). The wax-like fluorocarbon telomer is preferably obtained as a dispersion by reacting tetrafluoroethylene in the presence of methyl cyclohexane and 1,1,2-trichlorotrifluoroethylene; the dispersion of the telomer is then mixed with an alkyl, cycloalkyl or aralkyl titanate dissolved in a neutral, inert, volatile solvent. The resultant composition is significantly useful as a convenient source of a dry lubricant which is characterized by exhibiting improved abrasion resistance by which the durability and usefulness of films of the lubricant are markedly increased.

Films or coatings of the wax-like fluorocarbon telomer alone on hard, smooth surfaces are, for some purposes, too readily and easily removed by brisk rubbing; the lubrication provided by the applied material is too soon lost. To restore and maintain the lubrication, repeated applications of the lubricant must be made when the film or coating of the lubricant is subjected to constantly repeated rubbing, particularly rubbing under even moderate pressure. A problem has been to increase the adherence of the fluorocarbon telomer to the surface of metal, glass, wood, plastics and fabrics so that the life of the lubricating film would be extended and the cost for the labor and material to renew or replace it reduced.

It is, therefore, an object of the present invention to provide a film or coating of a wax-like telomer of tetrafluoroethylene having improved abrasion resistance. Another object is to provide a film of a wax-like tetrafluoroethylene telomer exhibiting an increased abrasion durability with the retention of the desirable lubricating and other properties of the telomer. Still another object of this invention is to provide a tetrafluoroethylene telomer composition having improved adhesion to the surface of materials to which it is applied.

These and other objects will become apparent in the following description and claims.

More specifically, the present invention is directed to a composition comprising a mixture of (a) one part of a tetrafluoroethylene telomer produced by reacting one mole of tetrafluoroethylene at a temperature within the range of 75° to 200° C. in the presence of from about 2 moles to about 3 moles of 1,1,2-trichlorotrifluoroethylene, from 0.01 to 0.1 mole of an active telogen, and from 0.05% to 3% by weight based on the tetrafluoroethylene of an organic peroxide, and (b) 0.1 to 25 parts of an organic titanium compound having the general formula

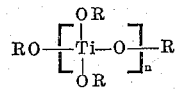

wherein $R_1$, $R_2$, $R_3$ and $R_4$ may be alike or different and represent organic radicals selected from the group consisting of straight chain or branched alkyl radicals having 2 to 22 carbon atoms, cycloalkyl radicals, and aralkyl radicals and halogen and hydroxy derivatives of such alkyl, cycloalkyl and aralkyl radicals, or, a prepolymerized ester of orthotitanic acid having the structure

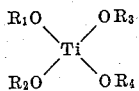

wherein R is a straight chain or branched $C_3$ to $C_5$ alkyl group and $n$ is an integer greater than one, and (c) one or more saturated, volatile organic compounds selected from the group consisting of hydrocarbons, fluorochlorocompounds, and chlorocarbons, said compounds being volatile at atmospheric pressure and the usually prevailing room temperatures.

A preferred composition according to the present invention is one wherein the active telogen is methyl cyclohexane, the organic peroxide catalyst is di-tert-butyl peroxide, and the organic titanium compound is a tetraalkyl titanate wherein each alkyl radical has from 2 to 22 carbon atoms.

The fluorocarbon telomer-titanate ester composition of the present invention may be prepared by mixing a tetrafluoroethylene telomer dispersed in 1,1,2-trichlorotrifluoroethane with a solution of an orthotitanic acid ester in a neutral, inert, volatile solvent to provide from about 0.05 part to about 25 parts of titanate for each part of fluorocarbon telomer and by forming a film or coating on the surface of materials by applying the resultant mixture and allowing the solvent and 1,1,2-trichlorotrifluoroethane to evaporate.

The telomer with wax-like properties, well adapted for use as a lubricant, and employed in mixtures with selected organic titanium compounds according to the present invention is that prepared by polymerizing 1 mole of tetrafluoroethylene in the presence of about 2 to about 3 moles of trichlorotrifluoroethane and 0.01 to 0.10 mole of an active telogen, this polymerization being carried out in a closed system with a peroxide catalyst at a temperature within the range of 75° C. and 200° C. and at autogenous pressure.

This telomer dispersed in 1,1,2-trichlorotrifluoroethane is obtained by use of telomerization techniques, as described, for example, in U.S. Patent No. 2,540,088. In general, the telomerization is carried out by first charging an autoclave or other pressure vessel with an active telogen, with trichlorotrifluoroethane, with a peroxide catalyst and then introducing tetrafluoroethylene gas under pressure or by passing it into the cooled reactor. The charged reaction vessel is then heated to a temperature between 75° and 200° C. and the reaction allowed to proceed. Pressures will be generated between about 300 and 600 p.s.i.g. and as the reaction nears completion, the pressure within the system will be observed to drop.

In preparing this tetrafluoroethylene telomer dispersed in 1,1,2-trichlorotrifluoroethane, it is necessary to control carefully the amounts of tetrafluoroethylene, trichlorotrifluoroethane and active telogen. For each mole of tetrafluoroethylene, it is necessary to have present, in the reaction mass, 2 to 3 moles of trichlorotrifluoroethane, and, from about 0.01 to about 0.10 mole of active telogen. If less than 0.01 mole of active telogen is used, the product is of higher molecular weight and is less wax-like, approaching, as the telogen is decreased, polytetrafluoroethylene itself. If much above 0.10 mole active telogen is used per mole of tetrafluoroethylene, the molecular weight becomes too low and the properties of the product progress from wax-like to grease-like to liquid as the amount of active telogen increases. On the other hand, if much more than 3 moles of trichlorotrifluoroethane is used per mole of tetrafluoroethylene, the dispersion is too dilute for practical purposes. If less than about 2.5 moles of the trichlorotrifluoroethane is used, the viscosity of the resultant product is very high, resulting in poor heat transfer during preparation. It is important to carry out the process within the ratios described to obtain the present novel dispersion.

It has been established by chemical analysis that the trichlorotrifluoroethane takes part in the telomerization process; said trichlorotrifluoroethane acts as a telogen to some extent. Thus, it follows that the wax-like product obtained is probably a mixture of telomers; one species being a reaction product of tetrafluoroethylene with the trichlorotrifluoroethane and another species being the reaction product of tetrafluoroethylene with the active telogen. The final product, then, is a dispersion of these wax-like compounds in the trichlorotrifluoroethane.

The trichlorotrifluoroethane may be either isomer; i.e., it may be 1,1,1-trichlorotrifluoroethane or 1,1,2-trichlorotrifluoroethane. The latter isomer is preferred.

The term "active telogen" utilized according to the present invention describes a telogen which is well known in the art and is one of numerous compounds. Representative active telogens are tertiary hydrocarbons such as isobutane, methylcyclopropane, methylcyclohexane, etc.; ethers with alpha hydrogen atoms such as tetrahydrofuran, diethylether, dioxane, etc.; amines such as trimethylamine, triethylamine, etc.; alcohols such as methanol, ethanol, isopropanol, sec-butyl alcohol, cyclohexanol, etc.; bivalent sulfur compounds such as ethyl mercaptan, dimethyldisulfide, etc.

The active telogen, although present in very small amounts, contributes significantly to the obtaining of the fluorocarbon telomer without undesirable by-products. If the telomerization is carried out without the active telogen, high molecular weight products are obtained which are not wax-like. The presence of the active telogen in the amounts specified results in products having a molecular weight in the order of 2000; TFE polymers of this molecular weight have wax-like properties.

As indicated, the reaction is carried out with a peroxide catalyst. This catalyst may be any organic peroxide which generates free radicals at the reaction temperature. Based on availability of catalysts and convenience temperatures of about 75° C. to about 200° C. will usually be used, and the catalyst employed will be chosen according to its ability to generate free radicals at the specific temperature selected. The catalyst usually employed will be benzoyl peroxide, di-tert-butyl peroxide, or ethyl peroxide. With di-tert-butyl peroxide, which is the preferred catalyst, a temperature of 130° C. will be used. The concentration of catalyst taken will usually be in the range of 0.05% to 3% by weight of TFE, the preferred amount being about 2%.

The preferred telomer is that prepared by reacting tetrafluoroethylene in the presence of 1,1,2-trichlorotrifluoroethane, methylcyclohexane, and di-tert-butyl peroxide. By way of illustrating how the telomer may be prepared the following procedure is given.

A clean, dry 10-gallon stainless steel, steam-jacketed autoclave, equipped with a cooling coil, anchor-type agitator, and intake and discharge tubes, is flushed with nitrogen and filled with a solution of 1,1,2-trichlorotrifluoroethane containing 0.76% by weight of methylcyclohexane and 0.28% by weight of di-tert-butyl peroxide. The take-off valve is set for 600 p.s.i.g. and the temperature raised to 160° C. The above 1,1,2-trichlorotrifluoroethane solution is then fed to the autoclave at a rate of 68.7 lbs. per hour. At the same time tetrafluoroethylene under a pressure of 650 to 750 p.s.i. is introduced into the autoclave at a rate of 20 lbs. per hour. When a steady reaction state is reached a dispersion of a tetrafluoroethylene telomer dispersed in 1,1,2-trichlorotrifluoroethane at a solids concentration of about 20% is obtained. The actual concentration may be greater or less than 20% when the proportion of the 1,1,2-trichlorotrifluoro solution fed to the autoclave is less or greater than that shown above.

The dispersion of the tetrafluoroethylene telomer in 1,1,2-trichlorotrifluoroethane as obtained by the heretofore-described process will normally be mixed with a titanate ester and a selected solvent to compose the composition of the present invention. The dispersion, however, may be diluted with 1,1,2-trichlorotrifluoroethane or it may be concentrated to a desired extent by distilling off the required amount of the dispersing medium. If the evaporation is taken to dryness, that is, if all of the dispersing medium is evaporated from the dispersion, the dispersed telomer becomes a hard aggregated material. When then mixed with the original dispersing medium or other organic liquid, it does not swell or swells only partially and fails to redisperse to revert to its original condition of a finely divided, homogeneous, dispersion.

The operative titanium compounds are tetra esters and polymerized esters of orthotitanic acid ($H_4TiO_4$). The tetra esters are alkyl, cycloalkyl, and aralkyl esters, the radicals of which may be substituted with a halogen or hydroxy group. Titanates of the general formula

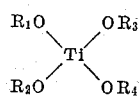

wherein the R's may be alike or different and represent alkyl groups of from 2 to 22 carbon atoms, cycloalkyl groups, and aralkyl groups which may contain halogen or hydroxy substituents, that may be employed in the invention include the following representative compounds: Tetraethyl titanate; tetrapropyl titanate; tetraisopropyl titanate; tetrabutyl titanate; tetracyclobutyl titanate; tetrapentyl titanate; tetrahexyl titanate; tetracyclohexyl titanate; tetraoctyl titanate; tetrakis(2-ethylhexyl)titanate; tetradecyl titanate; tetraoctadecyl titanate; tetrabenzyl titanate;

Diisopropyl-bis(2-bromo-1-(bromomethyl(ethyl) titanate;
Diisopropyl-bis(3-chloropropyl) titanate;
Diisopropyl-bis(1H,1H-pentafluoropropyl) titanate;
Diisopropyl-bis(2-chloro-1-(chloromethyl)ethyl) titanate;
Triisopropyl-(2-ethyl-3-hydroxyhexyl) titanate;
Diisopropyl-dioctadecyl titanate;
Diisopropyl-ditetracosyl titanate;
Diisopropyl-bis(o-chlorobenzyl) titanate;
Butyl-trioctadecyl titanate;
Dibutyl-dibenzyl titanate;
Dibutyl-dicyclohexyl titanate;
Dibutyl-bis(1H,H,5H-octafluoropentyl) titanate;
Dibutyl-bis(o-chlorobenzyl) titanate;
Dibutyl-dioctadecyl titanate;
Dibutyl-bis(2-hydroxy-3-methylpropyl) titanate;
Dibutyl-bis(4-chlorobutyl) titanate;
Tributyl-(4-hydroxybutyl) titanate.

The heretofore-described compounds may be prepared by methods which are known in the art, as described, for example, in U.S. Patent 2,187,821, and Post, "Chemistry of the Aliphatic Ortho Esters" (1943), page 133. For example, titanium tetrachloride is reacted with an alkanol in the presence of ammonia or a higher alkanol undergoes ester interchange with a lower alkyl titanate. The titanates where unsymmetrical compounds are indicated may be prepared by such an ester interchange by heating a symmetrical, lower alkyl tetraester with an optional proportion of a different alcohol or diol, whereby a mixed reaction product is obtained. Such mixed reaction products may be used directly in this invention without regard to the degree of alkyl radical interchange which has taken place and without separation into their constituents.

The polymerized titanate esters are prepared by a process described in Example III of U.S. Patent 2,621,193 (Langkammerer to Du Pont). Representative polyalkyl titanate compounds that may be employed include those in which the alkyl group is propyl, isopropyl, butyl, isobutyl, tert-butyl, 1-methyl propyl, pentyl, 1-methyl butyl, 1-ethyl propyl, 3-methyl butyl, and 1,1-dimethyl propyl.

A generic formula which encompasses both the tetra-esters and the polymerized esters is

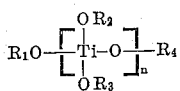

wherein $n$ is an integer one and greater than one, when $n=1$ the R's are defined as heretofore defined and when $n$ is greater than one, the R's are the same and represent straight chain or branched alkyl radicals of 3 to 5 carbon atoms.

The amount of titanium compound employed is about 0.05 part to about 25 parts per part by weight of tetrafluoroethylene telomer, preferably 2 parts to 5 parts per part of telomer.

The saturated volatile organic compound utilized according to the present invention acts as a medium for the solution and dispersion of the mixture of the heretofore-described titanic acid ester and the wax-like telomer; and, from the composition, suitable thin films and coatings may be applied. Suitable volatile organic compounds for this purpose which dissolve the titanate and in which the insoluble tetrafluoroethylene telomer is dispersed include hydrocarbons such as hexane, heptane, octane, benzene, toluene; chlorocarbons such as chloroform, carbon tetrachloride, chlorobenzene; and fluorochloro carbons such as 1,1,2-trichlorotrifluoroethane, 1,1,1-trichlorotrifluoroethane, 1,2-difluorotetrachloroethane, dichlorodifluoromethane, trichlorofluoromethane and the like.

Particularly preferred solution and dispersing media are propellents or mixtures of propellents which are liquified gases at 70 p.s.i.g. and normal room temperature, such as are used in preparing aerosol spray compositions for insecticides, deodorants, perfumes, hair-treating agents and the like. Usually these propellents are fluorinated or chlorofluorinated derivatives of methane and ethane. A preferred dispersing medium for preparing aerosol spray formulations of the telomer-titanate mixture comprises from about 12 parts to about 100 parts of difluorodichloromethane and 0.1 to about 40 parts of a trichlorotrifluoroethane, to which may be added up to about 80 parts of fluorotrichloromethane. Such aerosol formulations preferably will contain the telomer in a concentration of about 0.1% to about 10% by weight and a concentration of titanate from about 0.01% to 50%.

The composition of the present invention is applied to the hard, smooth surface of metal, glass, plastics, and wood by spraying, dipping, brushing, and roll-coating. It may also be applied to the surface of glass fabrics and textile fabrics, particularly those that are closely woven and on which a dry lubricant of the type of the wax-like tetrafluoroethylene telomer is used. The dispersion media are selected to be suitable for the method of application; the relatively low boiling propellents are chosen for aerosol formulations, and higher boiling compounds are selected for the compositions which are applied, for example, by brushing.

TEST UTILIZED TO DETERMINE EFFECT OF TITANATE

The abrasion resistance imparted to a film or coating of the wax-like tetrafluoroethylene telomer by incorporation of a titanate is measured by an apparatus designed to determine whether or not color may be transferred from the surface of dyed textile materials to other surfaces by rubbing. The apparatus is known as a crock-meter and is described in Standard Test Method 8-1957 of the American Association of Textile Chemists and Colourists, Technical Manual, 35, 96, 1959. A test film is rubbed with a standard abrasive cloth under controlled conditions. The number of passes of the abrasive cloth over the film that are required to remove the film from a glass surface is taken to denote the abrasion resistance. On the glass a sharp end point of clarity in contrast to the opacity caused by the telomer film is easily observed. The titanate by itself gives a clear film.

A 1-inch by 3-inch glass plate bearing a film to be tested is fastened to the apparatus. A square of 80 x 80 cotton muslin abrasive testing cloth is mounted over the end of a ⅝-inch cylindrical finger which projects downward from a weighted sliding arm. The covered finger is lowered onto the film under a weight that exerts a pressure of 7.2 lbs. per sq. in. and is caused to slide back and forth by turning a crank.

Representative examples illustrating the present invention follow.

Example 1

An 8-ounce aerosol can was charged with 15.6 g. of a 16% dispersion of tetrafluoroethylene telomer in 1,1,2-trichlorotrifluoroethane prepared as described above and 2.5 g. of tetrabutyl titanate (the tetrabutyl ester of orthotitanic acid) and the can and its contens were cooled in an acetone-solid carbon dioxide bath. To the can was then added 232 g. of a similarly cooled liquid comprising 60% by weight of trichlorofluoromethane and 40% of dichlorodifluoromethane. This procedure provides a total aerosol charge of 250 g. containing 2.5 g. or 1% each of the fluorocarbon telomer and the tetrabutyl titanate. A portion of the composition was sprayed onto the surface of 1-inch by 3-inch glass plates from a distance of about 6 inches, and the 1,1,2-trichlorotrifluoroethane allowed to evaporate leaving a uniform, opaque film of the telomer-titanate mixture on the surface of the glass. The film was then tested for its abrasion resistance as heretofore described.

It took more than 100 passes of the fabric-covered finger to remove the waxy film and to restore the transparency of the glass as compared with only five passes to remove a film of the same wax-like telomer to which no titanate ester had been added.

This procedure was repeated employing different titanate esters. The esters mixed with the fluorocarbon telomer and the abrasion resistance of the resultant films as indicated by the number of passes of the abrader to rub the film from a glass plate are presented in Table 1 which follows.

TABLE 1.—DURABILITY OF TETRAFLUOROETHYLENE TELOMER-TITANATE FILMS ON GLASS

| Titanate Ester Present, 1% with 1% telomer in trichlorotrifluoroethane | Number of passes of abrader to remove film from glass surface |
|---|---|
| None (control) | 5 |
| Tetraisopropyl titanate | >100 |
| Tetrabutyl titanate | >100 |
| Tetraoctyl titanate | 10 |
| Diisopropyl-bis(1H,1H-pentafluoropropyl) titanate | 100 |
| Dibutyl-dicyclohexyl titanate | >100 |
| Dibutyl-dioctadecyl titanaate | 10 |
| Dibutyl-bis(o-chlorobenzyl) titanate | >100 |
| Dibutyl-bis(2-hydroxy-3-methylpropyl) titanate | >100 |
| Dibutyl-bis(4-chlorobutyl) titanate | 60 |

When poly(dibutyl titanate), in an amount equal to that of the tetrafluoroethylene telomer in the composition of Example 1, is substituted for tetrabutyl titanate, more than 100 passes of the abrader were again required to remove the telomer-titanate film from the surface of the glass.

Example 2

EFFECT OF AMOUNT OF TITANATE

By the procedure of Example 1, from 0.1 part to 25 parts of tetrabutyl titanate per part of the tetrafluoroethylene telomer were added to the aerosol formulation of the tetrafluoroethylene telomer in trichlorofluoromethane and dichlorodifluoromethane, and the resultant films on glass were tested for abrasion resistance. The results are presented in Table 2 which follows.

TABLE 2.—EFFECT OF CONCENTRATION OF TETRABUTYL TITANATE ON ABRASION RESISTANCE OF TETRAFLUOROETHYLENE TELOMER FILM

| Amount of Tetrabutyl Titanate Added, Parts per Part of Telomer | Number of Passes of Abrader to Remover Film from Glass Surface |
|---|---|
| 0.0 (control) | 6 |
| 0.1 | 12 |
| 0.5 | 20 |
| 1 | >100 |
| 2 | >100 |
| 5 | >100 |
| 10 | 70 |
| 25 | 70 |

The results indicate that under the specific conditions of application employed in this example the best abrasion resistance is obtained with from about 1 part to about 5 parts of the tetrabutyl titanate for each part of fluorocarbon telomer, although a definite increase in the abrasion resistance is imparted by as little as 0.1 of a part of the titanate. With the high preponderance of titanate of 25 parts per part of telomer a marked, but not optimum, improvement in the durability of the telomer in the film is attained.

*Example 3*

EFFECT OF TITANATE ON LUBRICITY

The aerosol formulation of Example 1 containing 1% each of the tetrafluoroethylene telomer and tetrabutyl titanate and an aerosol formulation containing only the tetrafluoroethylene telomer were employed to coat a 1″ x 6″ block of steel and the end of a ¾″-diameter cylinder of steel. The cylinder was mounted in a stationary position in a modified "Instron" tensile testing instrument, and the coated surface of the block was drawn across the coated surface of the cylinder under various loads. The ratio of the measured force required to move the block at a linear velocity of 5 inches per minute to the force holding the two surfaces in contact was taken as the coefficient of friction of the film with which the steel (block and cylinder) was coated. The operation was repeated using aluminum metal, hard wood finely sanded, and enameled wood. The results are set forth in Table 3 which follows.

TABLE 3.—COEFFICIENT OF FRICTION OF FILM OF TELOMER WITH AND WITHOUT TETRABUTYL TITANATE

| Surface | Coefficient of Friction | |
|---|---|---|
| | Tetrafluoroethylene Telomer Alone | Tetrafluoroethylene Telomer plus Equal Amount of Tetrabutyl Titanate |
| Steel | 0.11 | 0.07 |
| Aluminum | 0.17 | 0.13 |
| Unpainted wood (maple) | 0.10 | 0.09 |
| Enameled wood | 0.07 | 0.07 |

From the above test results it is noted that the tetrafluoroethylene telomer provides a low coefficient of friction when used as a lubricant between sliding metal and wood surfaces. The incorporation of the titanate to improve the durability of the telomer on surfaces does not decrease the lubricity of the telomer. Actually, a small improvement in lubricity may usually be observed as indicated in Table 3.

It is to be understood that any of the heretofore-described organic titanate esters and polymerized titanate esters may be substituted in the preceding examples to give substantially the same results. In addition, any of the described tetrafluoroethylene telomer compositions may be utilized in the same examples to give essentially the same results. The heretofore-described volatile organic compounds may also be utilized in the same examples to produce substantially the same results. Other variations and modifications of reaction conditions and concentrations within the skill of the art may be utilized.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition consisting essentially of a mixture of (a) 1 part of a wax-like tetrafluoroethylene telomer produced by reacting 1 mole of tetrafluoroethylene, at a temperature within the range of 75° C. to 200° C., in the presence of from about 2 moles to about 3 moles of a compound selected from the group consisting of 1,1,1-trichlorotrifluoroethylene and 1,1,2-trichlorotrifluoroethylene, from 0.01 to 0.1 mole of an active telogen and from about 0.05% to 3%, by weight, based on said tetrafluoroethylene of an organic peroxide, and (b) from 0.1 to 25 parts per part of said tetrafluoroethylene telomer of an organic titanate of the structure

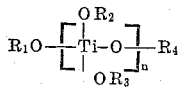

wherein $n$ is an integer having a value of at least 1, when $n$ is 1, $R_1$, $R_2$, $R_3$ and $R_4$ need not be alike and are organic radicals selected from the group consisting of straight chain and branched alkyl radicals having 2 to 22 carbon atoms, cycloalkyl radicals, aralkyl radicals and halogen and hydroxy derivatives of said alkyl, cycloalkyl and aralkyl radicals; and, when $n$ is greater than 1, $R_1$, $R_2$, $R_3$ and $R_4$ are the same and are radicals selected from the group consisting of straight chain and branched alkyl radicals having 3 to 5 carbon atoms, and (c) at least 1 saturated, volatile organic compound selected from the group consisting of hydrocarbons, fluorochloro carbons and chlorocarbons.

2. A composition according to claim 1 wherein the active telogen is methylcyclohexane, the organic peroxide catalyst is di-tert-butyl peroxide and the organic titanate is a tetraalkyl titanate wherein said alkyl radical has from 2 to 22 carbon atoms.

3. A composition according to claim 1 wherein the active telogen is dimethyl disulfide, the organic peroxide catalyst is di-tert-butyl peroxide and the organic titanate is a tetraalkyl titanate wherein said alkyl radical has from 2 to 22 carbon atoms.

4. A composition according to claim 1 wherein the active telogen is methanol, the organic peroxide catalyst is di-tert-butyl peroxide and the organic titanate is a tetraalkyl titanate wherein said alkyl radical has from 2 to 22 carbon atoms.

References Cited in the file of this patent

UNITED STATES PATENTS

| | | |
|---|---|---|
| 2,160,273 | Loane et al. | May 30, 1939 |
| 2,576,837 | Irwin | Nov. 27, 1951 |
| 2,695,880 | Benning et al. | Nov. 30, 1954 |
| 2,706,715 | Conner | Apr. 19, 1955 |
| 2,795,553 | Lowe | June 11, 1957 |
| 2,927,895 | Neunherz | Mar. 8, 1960 |